(12) United States Patent
Maher et al.

(10) Patent No.: US 10,728,622 B2
(45) Date of Patent: Jul. 28, 2020

(54) MANAGEMENT OF NON-LINEAR CONTENT PRESENTATION AND EXPERIENCE

(71) Applicant: Sony Interactive Entertainment LLC, San Mateo, CA (US)

(72) Inventors: Matt Maher, San Mateo, CA (US); Ripin Natani, San Mateo, CA (US); Harshank Vengurlekar, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/687,011

(22) Filed: Aug. 25, 2017

(65) Prior Publication Data

US 2019/0069031 A1    Feb. 28, 2019

(51) Int. Cl.
| | |
|---|---|
| *H04N 21/466* | (2011.01) |
| *H04N 21/234* | (2011.01) |
| *H04N 21/2387* | (2011.01) |
| *H04N 21/6377* | (2011.01) |
| *H04N 21/6587* | (2011.01) |
| *H04N 21/81* | (2011.01) |
| *H04N 21/431* | (2011.01) |
| *H04N 21/442* | (2011.01) |
| *H04N 21/472* | (2011.01) |
| *H04N 21/488* | (2011.01) |

(52) U.S. Cl.
CPC ..... *H04N 21/4668* (2013.01); *H04N 21/2387* (2013.01); *H04N 21/23418* (2013.01); *H04N 21/4312* (2013.01); *H04N 21/44213* (2013.01); *H04N 21/47202* (2013.01); *H04N 21/4882* (2013.01); *H04N 21/6377* (2013.01); *H04N 21/6587* (2013.01); *H04N 21/8126* (2013.01)

(58) Field of Classification Search
None
See application file for complete search history.

(56) References Cited

U.S. PATENT DOCUMENTS

| | | | |
|---|---|---|---|
| 5,913,214 | A | 6/1999 | Madnick et al. |
| 8,413,204 | B2 | 4/2013 | White et al. |
| 8,745,206 | B1 | 6/2014 | Chang et al. |

(Continued)

FOREIGN PATENT DOCUMENTS

WO    WO 2019/013874    1/2019

OTHER PUBLICATIONS

PCT Application No. PCT/US2018/034368 International Search Report and Written Opinion dated Jun. 25, 2018.

(Continued)

*Primary Examiner* — Jason K Lin
(74) *Attorney, Agent, or Firm* — Polsinelli PC

(57) ABSTRACT

Systems and methods for management of non-linear content presentation and experience are provided. At least one stream may be evaluated in real-time to detect when an event occurs within the evaluated stream. A priority score may be assigned to the detected event, wherein the priority score is updated in real-time. An offer may be generated to a user device regarding the detected event, wherein the user device is not playing the evaluated stream. An acceptance may be received from the user device. The evaluated stream to the user device, wherein the evaluated stream is provided at a point prior to the detected event.

22 Claims, 3 Drawing Sheets

(56) References Cited

U.S. PATENT DOCUMENTS

| | | | |
|---|---|---|---|
| 9,021,517 B2 | 4/2015 | Selim | |
| 9,332,300 B2 | 5/2016 | Jung | |
| 9,473,819 B1 | 10/2016 | Bostick et al. | |
| 9,736,503 B1 | 8/2017 | Bakshi et al. | |
| 9,854,317 B1 | 12/2017 | Abboa-Offei et al. | |
| 9,904,703 B1 | 2/2018 | Haugen et al. | |
| 10,405,017 B1* | 9/2019 | Roka | H04N 21/4627 |
| 2002/0124252 A1 | 9/2002 | Schaefer et al. | |
| 2003/0018967 A1* | 1/2003 | Gorbatov | H04N 7/088 |
| | | | 725/32 |
| 2003/0142238 A1* | 7/2003 | Wasack | H04N 21/84 |
| | | | 348/571 |
| 2005/0015803 A1* | 1/2005 | Macrae | H04N 5/44543 |
| | | | 725/41 |
| 2008/0228716 A1 | 9/2008 | Dettinger et al. | |
| 2008/0263006 A1 | 10/2008 | Wolber et al. | |
| 2009/0133069 A1 | 5/2009 | Conness | |
| 2010/0125891 A1 | 5/2010 | Baskaran | |
| 2010/0175088 A1 | 7/2010 | Loebig et al. | |
| 2011/0035462 A1* | 2/2011 | Akella | H04N 7/163 |
| | | | 709/217 |
| 2012/0174157 A1* | 7/2012 | Stinson, III | H04N 5/44543 |
| | | | 725/40 |
| 2012/0284752 A1* | 11/2012 | Jung | H04N 21/431 |
| | | | 725/41 |
| 2013/0125181 A1 | 5/2013 | Montemayor et al. | |
| 2013/0263185 A1* | 10/2013 | Wood | H04N 21/25808 |
| | | | 725/56 |
| 2014/0089953 A1* | 3/2014 | Chen | H04N 21/8126 |
| | | | 725/1 |
| 2014/0143266 A1 | 5/2014 | Bice et al. | |
| 2014/0325556 A1* | 10/2014 | Hoang | H04N 21/431 |
| | | | 725/32 |
| 2015/0020127 A1* | 1/2015 | Doshi | H04N 21/47202 |
| | | | 725/88 |
| 2015/0082330 A1 | 3/2015 | Yun et al. | |
| 2015/0288997 A1* | 10/2015 | Basra | H04N 21/2358 |
| | | | 725/9 |
| 2015/0382062 A1* | 12/2015 | Sivaraman | H04N 21/47214 |
| | | | 725/50 |
| 2016/0179934 A1 | 6/2016 | Stubley et al. | |
| 2016/0213995 A1* | 7/2016 | Huebsch | A63B 71/06 |
| 2016/0277813 A1 | 9/2016 | Pizzo et al. | |
| 2016/0286244 A1* | 9/2016 | Chang | H04N 21/21805 |
| 2017/0006322 A1* | 1/2017 | Dury | H04N 21/254 |
| 2017/0070783 A1* | 3/2017 | Printz | G11B 27/022 |
| 2017/0085941 A1* | 3/2017 | Gupta | H04N 21/4312 |
| 2017/0230709 A1* | 8/2017 | Van Os | H04N 21/4394 |
| 2017/0257654 A1 | 9/2017 | Branch et al. | |
| 2017/0374402 A1* | 12/2017 | Pogorelik | H04N 21/25891 |
| 2018/0098123 A1* | 4/2018 | Larson | H04N 21/44222 |
| 2019/0014386 A1 | 1/2019 | Maher | |

OTHER PUBLICATIONS

U.S. Appl. No. 15/645,377 Final Office Action dated Aug. 6, 2018.
U.S. Appl. No. 15/645,377 Office Action dated Mar. 26, 2018.
U.S. Appl. No. 15/645,377 Office Action dated Sep. 20, 2019.
U.S. Appl. No. 15/645,377, Matt Maher, Non-Linear Content Presentation and Experience, filed Jul. 10, 2017.
PCT/US18/34368, Non-Linear Presentation and Experience, May 24, 2018.
PCT Application No. PCT/US2018/034368 International Preliminary Report on Patentability dated Jan. 14, 2020.
U.S. Appl. No. 15/645,377 Final Office Action dated Apr. 8, 2020.

\* cited by examiner

MANAGEMENT OF NON-LINEAR CONTENT PRESENTATION AND EXPERIENCE

BACKGROUND

1. Field of the Invention

The present technology pertains to content management, and more specifically to management of non-linear content presentation and experience.

2. Description of the Related Art

Presently available ways to consume content generally occur in a linear fashion. Such linear content consumption may include watching content as it is played on a user device screen. Certain pre-recorded content (e.g., DVD) may allow for jumping to certain chapters. While such chapters may be associated with a summary, the start of each chapter may be generally based on predefined time durations rather than the occurrence of events. While certain options are available to rewind or fast-forward, there is currently no way to jump to a specified event that occurred within the content.

Such lack is further exacerbated with real-time content, such as a broadcast of a sporting event taking place in real-time. Many sporting events are played at least partially concurrently. For example, multiple NFL football games are played on any given Sunday during the football season. It may therefore be difficult for a user to watch each game in real-time without a plurality of screens. Users who are interested in multiple concurrent games may therefore have to record one or more games to watch later. Such recording and subsequent watching does not allow the user to experience the event as soon as (or soon after) it happened so as to be able to participate in near real-time discussion and interaction related to the event.

There is, therefore, a need in the art for systems and methods of management of non-linear content presentation and experience.

SUMMARY OF THE PRESENTLY CLAIMED INVENTION

Embodiments of the present invention include management of non-linear content presentation and experience. At least one stream may be evaluated in real-time to detect when an event occurs within the evaluated stream. A priority score may be assigned to the detected event, wherein the priority score is updated in real-time. An offer may be generated to a user device regarding the detected event, wherein the user device is not playing the evaluated stream. An acceptance may be received from the user device. The evaluated stream to the user device, wherein the evaluated stream is provided at a point prior to the detected event.

Various embodiments may include systems for management of non-linear content presentation and experience. Such systems may include a processor that executes to evaluate at least one stream in real-time to detect when an event occurs within the evaluated stream, assign a priority score to the detected event, wherein the priority score is updated in real-time, and generate an offer to a user device regarding the detected event where the user device is not playing the evaluated stream. Such system may further include a communication interface that communicates over a communication network to receive an acceptance from the user device and to provide the evaluated stream to the user device, wherein the evaluated stream is provided at a point prior to the detected event.

Additional embodiments may include methods for management of non-linear content presentation and experience. Such methods may include evaluating at least one stream in real-time to detect when an event occurs within the evaluated stream, assigning a priority score to the detected event, wherein the priority score is updated in real-time, generating an offer to a user device regarding the detected event where the user device is not playing the evaluated stream, receiving an acceptance from the user device, and providing the evaluated stream to the user device, wherein the evaluated stream is provided at a point prior to the detected event.

Further embodiments include non-transitory computer-readable storage media having embodied thereon a program executable by a processor to perform a method for management of non-linear content presentation and experience as described above.

DETAILED DESCRIPTION

Embodiments of the present invention include management of non-linear content presentation and experience. A plurality of real-time streams of content may be received over a communication network. At least one of the streams may be provided in real-time to a user device to be played in real-time. At least one other stream may be evaluated in real-time to detect when an event occurs within the evaluated stream. The user device may be sent a notification when the event is detected in the evaluated stream. Such notification may be overlaid on a portion of the provided stream played at the user device. A request may be received from the user device concerning jumping to the detected event in the evaluated stream. The evaluated stream may then be provided to the user device at a point prior to the detected event.

Figure 1:
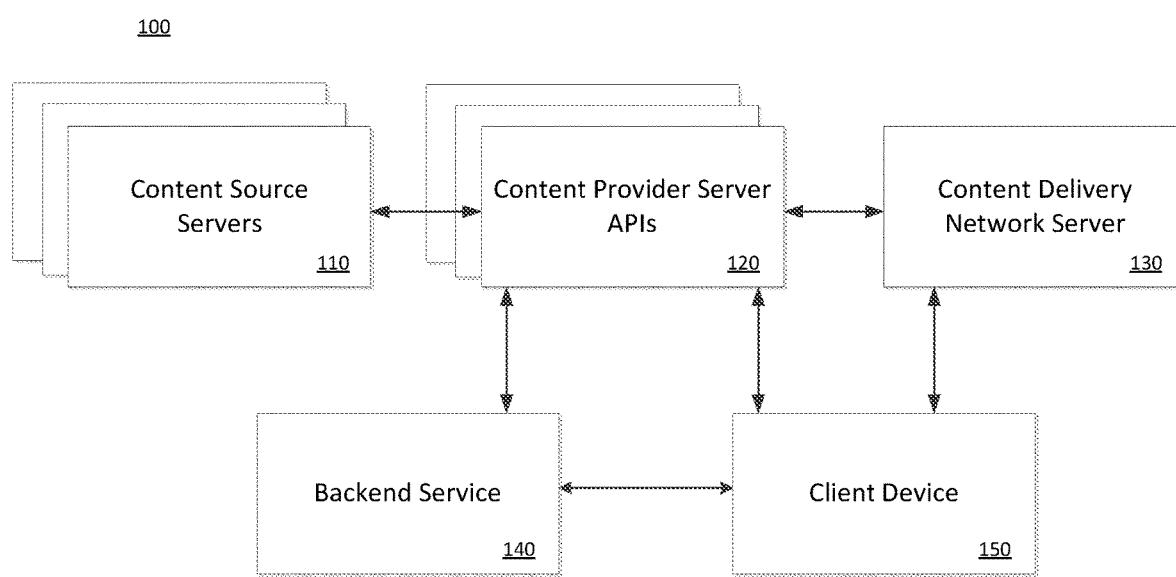
FIG. 1 illustrates a network environment in which a system for management of non-linear content presentation and experience may be implemented.

FIG. 1 illustrates a network environment 100 in which a system for management of non-linear content presentation and experience may be implemented. The network environment 100 may include one or more content source servers 110 that provide streaming content (e.g., video) for distribution (e.g., via one or more video on-demand (VOD) services), one or more content provider server application program interfaces (APIs) 120, content delivery network server 130, a backend service layer 140, and one or more client devices 150.

Content source servers 110 may maintain and provide media titles available for streaming. Such media titles may include not only pre-recorded content (e.g., DVR content), but also streams of live broadcasts (e.g., live sporting events, live e-sporting events, broadcast premieres). The content source servers 110 may be associated with any content provider that makes its content available to be streamed The streaming content from content source server 110 may be provided through a content provider server API 120, which allows various types of content sources server 110 to communicate with backend service layer 140. The content provider server API 120 may be specific to the particular language, operating system, protocols, etc. of the content source server 110 providing the streaming content. In a network environment 100 that includes multiple different types of content source servers 110, there may likewise be a corresponding number of content provider server APIs 120.

The content provider server API 120 therefore facilitates access of each of the client devices 150 to the content hosted by the content source servers 110. Additional information, such as metadata, about the accessed content can also be provided by the content provider server API 120 to the client device 150. As described below, the additional information (i.e. metadata) can be usable to provide details about the content being streamed to the client device 150. Finally, additional services associated with the accessed content such as chat services, ratings and profiles can also be provided from the content source servers 110 to the client device 150 via the content provider server API 120.

The content provider server API 120 can be accessed by a content delivery network server 130. The content delivery network server 130 may include a server that provides resources and files related to the streaming media, including promotional images and service configurations with client devices 150. The content delivery network server 130 can also be called upon by the client devices 150 that request to stream or subscribe to specific content.

The content provider server API 120 may be accessed by a backend service layer 140 in order to obtain information about available streaming content for the client device 150. As described below, the additional information about the content may include metadata describing the available content (e.g., by author, title, genre). The information may also include a location where the content is stored (e.g., URL) so that the client device 150 can proceed with retrieving the content from the content source server 110. Furthermore, the (e.g., author, title, genre) 120 may include instructions for implementing functionalities (e.g., chat) that would allow different client devices 150 to interact with each other. Such instructions may be used by the backend service layer 140 to provide certain functionalities to the client device 150.

The backend service layer 140 may be responsible for communicating with the different content source servers 110 in order to provide that content to the client device 150. The backend service layer 140 may carry out instructions, for example, for identifying the format of a media title and formatting the media title so as to be playable on the client device 150. Such formatting may include identifying the metadata associated with each of the content then using various different types of conversion techniques so that data stored in one format at the content source servers 110 may be rendered and displayed on the client devices 150, which may require a different format. As such, media titles of different formats may be provided to and made compatible with client device 150 via the backend service layer 140.

The client device 150 may include a plurality of different types of computing devices. For example, the client device 150 may include any number of different gaming consoles, mobile devices, laptops, and desktops. Such client devices 150 may also be configured to access data from other storage media, such as, but not limited to memory cards or disk drives as may be appropriate in the case of downloaded services. Such devices 150 may include standard hardware computing components such as, but not limited to network and media interfaces, non-transitory computer-readable storage (memory), and processors for executing instructions that may be stored in memory. These client devices 150 may also run using a variety of different operating systems (e.g., iOS, Android), applications or computing languages (e.g., C++, JavaScript). An exemplary client device 150 is described in detail herein with respect to FIG. 3.

In an exemplary implementation of non-linear content presentation and experience, content source servers 110 may provide real-time streams (e.g., different live sporting events) through content provider server APIs 120 to backend service layer 140 and to client device 150, which may play one of the streams. In the meantime, backend service layer 140 may be evaluating the other streams in real-time to detect events (e.g., touchdown or other type of scoring event) as they occur within their respective streams. When such an event is detected, a notification may be sent by backend service layer 140 to client device 150 to be overlaid on a portion of the playing content. A user of the client device 150 may opt to jump to another stream based on the notification that such an event occurred. When such a request to make such a jump is received by backend service layer 140, the stream being provided to the client device 150 may switch to the stream with the detected event at a point just prior to the event. As such, the client device 150 may experience events occurring across multiple streams shortly after each event's occurrence, as well as skipping time periods within the stream in which no events are detected.

An exemplary implementation of non-linear content presentation and experience may include the content source servers 110 providing real-time streams (e.g., different live sporting competitions) through content provider server APIs 120 to backend service layer 140 and to client device 150, which may play one of the streams. In the meantime, backend service layer 140 may be evaluating the other streams in real-time to detect events (e.g., touchdown or other type of scoring event) as they occur within their respective streams.

Detection of such event may be based on a variety of factors. Some factors may be directly derived from analysis of the content stream itself. For example, certain visual or audio parameters may be detected. Visual cues for a sporting competition may include score changes (especially where the score change results in a lead change), time on the clock, replays by the broadcaster, etc., individually or in combination with other factors. Analysis of such visual cues may therefore involve image analysis to recognize characters and numbers, video analysis, and comparison with previous images and video.

Audio analysis may include analyzing the sounds of an audience (e.g., cheers, jeers, sudden silences) or commentary by commentators. Such commentators may be part of the content stream being evaluated, or the commentary may be from another stream that may be associated with the evaluated stream. Audio analysis may therefore involve not only identifying the content of what is being said, but various parameters of the same, including timing, tone, volume, and changes to the same.

Natural language processing may therefore be applied to such audio factors, as well as to written content associated with the evaluated stream. Such written content may include microblogs and social media feeds associated with the evaluated stream. Such association may be identified based on hashtags, keywords, specified accounts/pages, social connections/followers, etc. Natural language processing may be used to derive the meaning of the content being generated and what such meaning indicates about the evaluated stream.

In association with natural language processing, sentiment analysis may be applied to any of the foregoing parameters. For example, analysis of the crowd noise, commentary by commentators, social media posts, related hashtags, etc. may be analyzed to identify reactions to a significant event. Such sentiment analysis can detect spikes in activity, as well as characterize the type of activity. For example, social media posts by fans of one sports team may indicate a sharp increase in happiness and excitement (and conversely, the fans of the competing sports team may show signs of disappointment and anger at the same time).

Social factors may also be considered in a manner so as to identify events that may be most relevant to a particular user. For example, the user device may be associated with a number of other devices that have been designated as "friend" devices. The activity of the friend devices may indicate an event of interest where such activity may include replays of a certain section of a content stream, pausing or slow-motion replay of certain section, screenshots taken of a certain section, chat activity, and other activity indicative of interest. Similarly, the social media accounts associated with the user of the user device may be used to identify events of interest.

Other information related to the evaluated stream may also be considered in identifying whether a significant event has occurred. Certain third party service providers may provide a data stream analyzing metadata related to the content stream (e.g. of a sports competition, television show, awards show). Such metadata may indicate excitement factors (including increases and decreases in the same).

When such an event is detected, a bookmark may be created and associated with a specified point within the evaluated stream. Such point may be a predefined (e.g., 5-10 seconds) time duration prior to the detected event. The bookmark may mark a place within the stream where a user device may jump directly to view the detected event. Where a particular stream may include multiple events, that stream may be associated with a corresponding number of bookmarks. Whereas the bookmark may mark the beginning of an event, the end of the event may likewise be detected through similar analytical approaches discussed above (e.g., decrease in excitement, lower activity in social media, etc.). In some embodiments, the bookmarks may further be associated with a short summary based on the evaluation. Such summary may be based on related hashtags, social media posts (e.g., those with particularly high number of reposts by others), or other results of the detection methods discussed above.

In addition, a notification may be sent by backend service layer 140 to client device 150 to be overlaid on a portion of the playing content. If the user device is not on, the notification may appear when the user device (or an associated screen) is switched on. In some embodiments, the notification may be pushed to one or more devices associated with a specified user, including mobile phone, tablet, computing device, television console, other entertainment console, etc. The particular devices may be specified based on user preference, as well as the types of streams, significance of events, or prioritization level of the events for which the user wishes to be notified.

In some embodiments, the notification may be associated with a menu of a plurality of different events deemed to be of significance or likely relevance to the viewer's interests. The events may be associated with the same or different streams of content. One option that may be selected in the menu may include a highlight reel of all events for a particular stream (e.g., a specified sporting competition). Such a highlight reel may include, for example, all touchdowns, field goals, sacks, and interceptions for an NFL football game. Such a highlight reel may be generated automatically based on the bookmarks indicating the start and end of each detected event within the evaluated content stream. In some embodiments, the highlight reels may further be customized to the requesting viewer based on significance or relevance as indicated by social or other user-specific factors.

Moreover, the highlight reel may be associated with the content stream if and when the content stream is made available for on-demand streaming at a later point in time. A user or viewer may therefore opt to catch up on the events of the content stream (e.g., that had been deemed significant based on evaluation) without having to sit through the entire linear playtime of the stream. In that regard, a viewer who wishes to catch up on a long-running episodic series may not be required to watch each and every episode of the series in linear fashion from beginning to end. Rather, such viewer may watch a highlight reel of just those events deemed significant by the evaluation methods discussed herein. Certain events may be assigned a priority score based on significance and relevance to the viewer as well, such that different sets of events may be characterized and selected by the viewer or for inclusion in the highlight reels. Priority scores may also be based on how old the event is, how many other viewers (or specified friends) have viewed (or subscribed to view) the event, and a variety of other factors related to the particular user, user device, user account, user friends, the event, the stream, the service provider for the stream, and other parameters related to the foregoing.

Each option in the notification may further be associated with an offer to allow the client device 150 to jump directly to a specified event (or set of events) without having to view any intervening content. Such an offer may require a certain subscription, certain monetary (or proprietary points or rewards) payment in order to jump directly to the detected event, watching certain advertising (which may be selected based on priority score), taking other actions, or other form of payment. In some instances, a user may have already fulfilled one or more requirements of the offer (e.g., have already paid for a subscription). Other users may not have, however. Such non-subscribing (or otherwise ineligible) users may therefore opt to accept the offer, which may entail a monetary payment (or other form of exchange as detailed above). As such, a user—who may be associated with a user account—may designate certain payment sources (e.g., credit card on file, prepaid balance) or sources of other forms of payment (e.g., rewards points), as well as certain user status information (e.g., subscriptions, rewards, status within a game or game network) that may affect the terms of the offer.

The requirements of the offer may be based on the priority score assigned to the event. As such, higher priority scores may require higher levels of payment or exchange than would lower priority scores. Because some priority scores are based on time-sensitive parameters, the offer may change as time goes by. As such, a user who checks a notification may see a different offer to view a specific event than would a user who checks a notification regarding the same event at a later point in time. Such offers may therefore be updated in real-time.

A user who wishes to view the offered event decide opt to agree to the offer. A user may wish to watch a big play that occurred in a sporting game, for example, that was particularly skillful or impactful on the outcome of the game. In other instances, a user may opt to watch (or rewatch) a certain event in light of later occurrences. For example, a viewer of a television series with multiple episodes may realize while watching a later episode that a particular event in a past episode was significant in a way that they had missed (or had a different significance than originally thought). That viewer may elect to jump directly back to the event for rewatching purposes.

A user of the client device 150 may be watching one stream and opt to jump to another stream based on the notification regarding the occurrence of one or more events in the other stream. The user may opt to make such a jump by agreeing to one or more offers presented in the notification in relation to the desired event(s). When such a request to make such a jump is received by backend service layer 140, the stream being provided to the client device 150 may switch to the stream with the detected event at a point just prior to the event. As such, the user device may experience events occurring across multiple streams shortly after each event's occurrence, as well as skipping time periods within the stream in which no events are detected.

Figure 2:
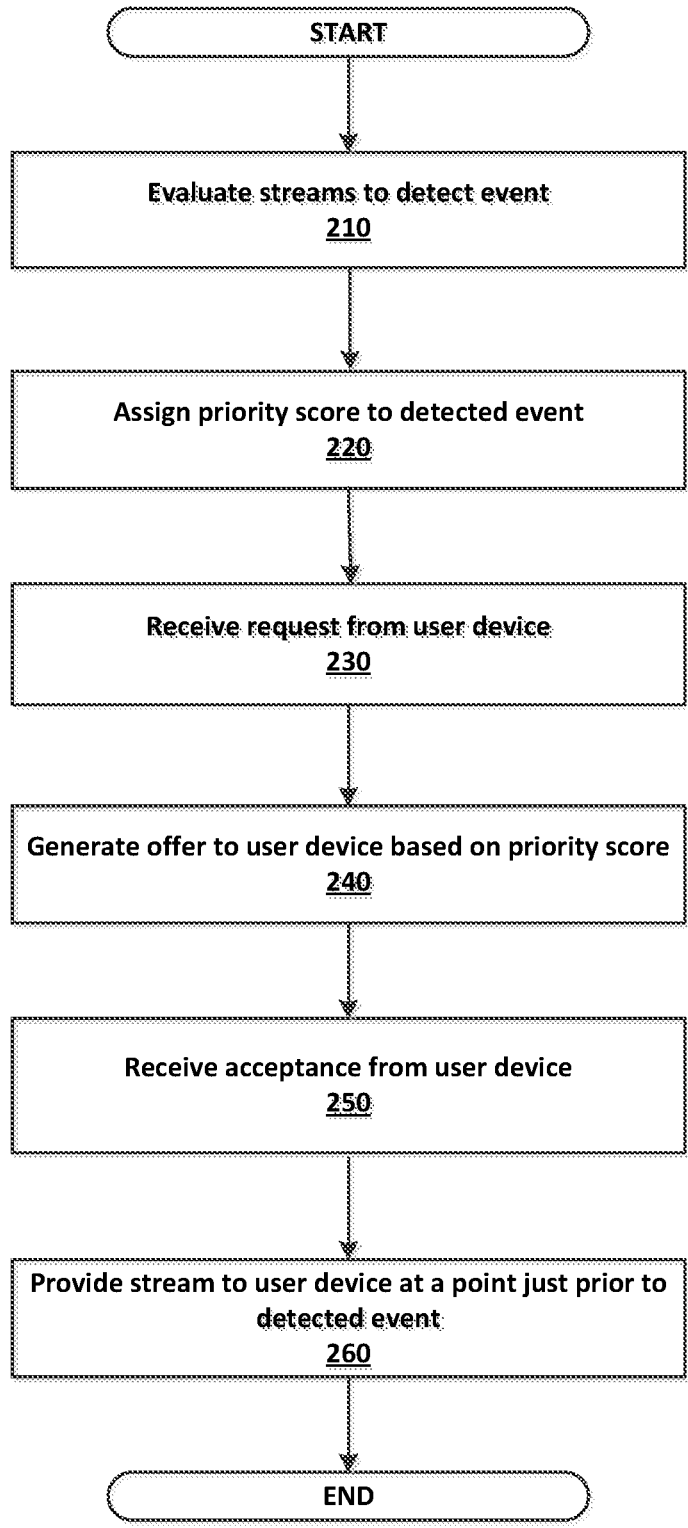
FIG. 2 is a flowchart illustrating an exemplary method for management of non-linear content presentation and experience.

FIG. 2 is a flowchart illustrating an exemplary method 200 for management of non-linear content presentation and experience. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200, at least one stream is evaluated to detect an event, a priority score is assigned to the detected event, a request is received from a user device, an offer is generated to the user device based on the assigned priority score, an acceptance is received from the user device, and the stream with the detected event is provided to the user device just prior to the detected event.

In step 210, at least one stream is evaluated to detect an event by backend service layer 140. Detection of the event may be based on identifying visual or audio events within the stream. For example, visual changes to the scoreboard or audio changes when a sporting crowd cheers or boos may be detectable. Detection of events may be based on evaluation of traffic in social media feeds or hashtags associated with the stream. Such social media feeds may also be prioritized based on defined "friends" of the user of the client device 150. Such evaluation of social media may include natural language processing and sentiment analysis to identify excitement or other reaction among a population experiencing the evaluated stream. In other embodiments, the evaluation may include tracking activity at another user device designated as a "friend" of client device 150. Such activity may include replay requests or screenshots taken. Evaluation may further be based on metadata associated with the stream. Such metadata may or may not be part of the actual stream. For example, a third party may provide the metadata regarding the evaluated stream.

In some embodiments, a bookmark may be generated to mark a point within the evaluated stream just prior to the detected event (e.g., by a predefined time period). As such, jumping to the bookmark allows a user to view the entire detected event.

In step 220, a priority score may be assigned to the detected event. Such priority score may be based on extent of current activity related to the event. For example, such priority may be based on amount of traffic in social media feeds (which may or may not be associated with designated friends), activity among friend devices, metadata indicating high excitement factors, whether the detected event resulted in a lead change in a sporting event, or any parameter indicative of the significance of the detected event.

In step 230, a request may be received from a client device 150 to view the detected event. Such client device 150 may be viewing another stream other than the stream in which the event was detected. In step 240, an offer may be made to the user device based on the assigned priority score, which is further updated in real-time. Such an offer may require a certain subscription, certain monetary (or proprietary points or rewards) payment in order to jump directly to the detected event, watching certain advertising (which may be selected based on priority score), or other form of payment.

In step 250, an acceptance may be received from client device 150, and in step 260, the evaluated stream may be provided to the client device 150 at a point just prior to the detected event. The point may be a predefined time period prior to the detected event so as to allow the user to view the event.

Figure 3:
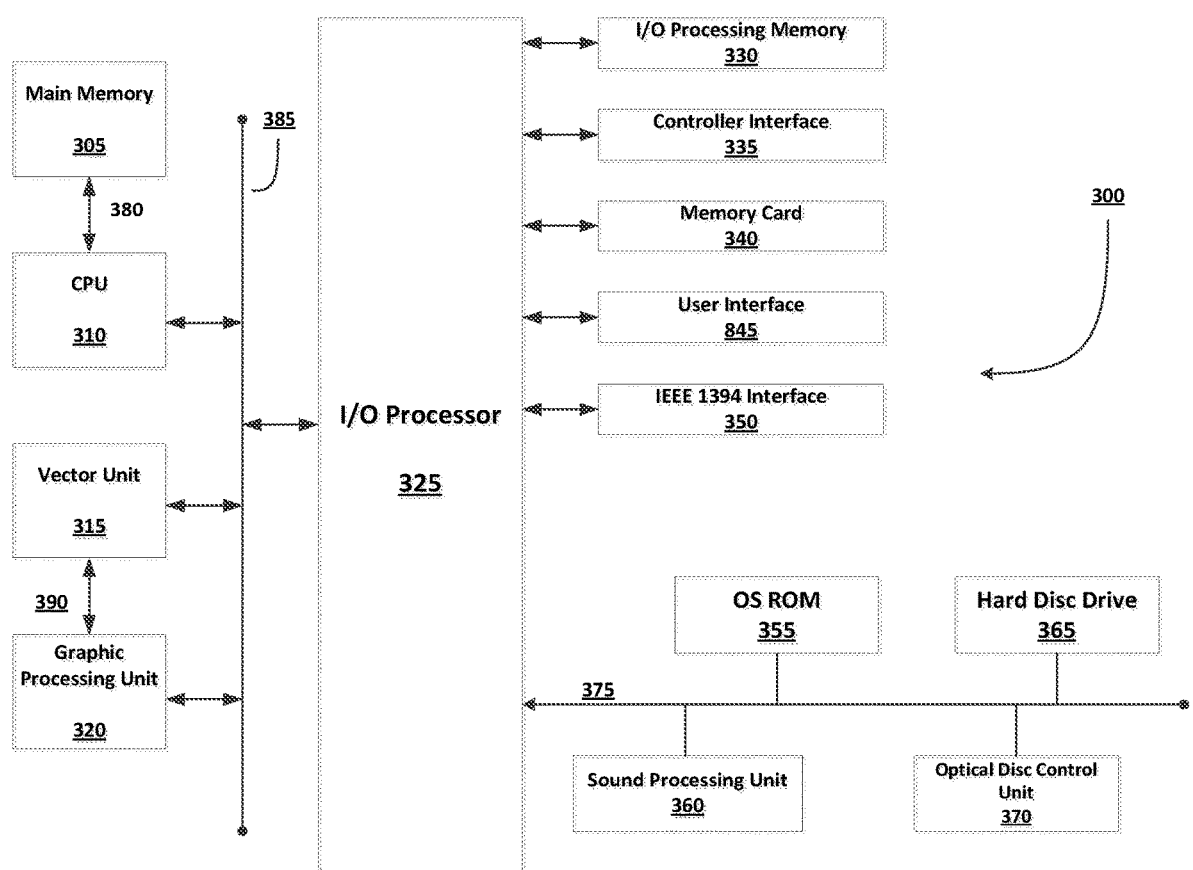
FIG. 3 is an exemplary electronic entertainment system that may be used in management of non-linear content presentation and experience.

FIG. 3 is an exemplary electronic entertainment system that may be used in real-time incorporation of user-produced media into a broadcast media stream. The entertainment system 300 of FIG. 3 includes a main memory 305, a central processing unit (CPU) 310, vector unit 315, a graphics processing unit 320, an input/output (I/O) processor 325, an I/O processor memory 330, a controller interface 335, a memory card 340, a Universal Serial Bus (USB) interface 345, and an IEEE 1394 interface 350. The entertainment system 300 further includes an operating system read-only memory (OS ROM) 355, a sound processing unit 360, an optical disc control unit 370, and a hard disc drive 365, which are connected via a bus 375 to the I/O processor 325.

Entertainment system 300 may be an electronic game console. Alternatively, the entertainment system 300 may be implemented as a general-purpose computer, a set-top box, a hand-held game device, a tablet computing device, or a mobile computing device or phone. Entertainment systems may contain more or less operating components depending on a particular form factor, purpose, or design.

The CPU 310, the vector unit 315, the graphics processing unit 320, and the I/O processor 325 of FIG. 3 communicate via a system bus 385. Further, the CPU 310 of FIG. 3 communicates with the main memory 305 via a dedicated bus 380, while the vector unit 315 and the graphics processing unit 320 may communicate through a dedicated bus 390. The CPU 310 of FIG. 3 executes programs stored in the OS ROM 355 and the main memory 305. The main memory 305 of FIG. 3 may contain pre-stored programs and programs transferred through the I/O Processor 325 from a CD-ROM, DVD-ROM, or other optical disc (not shown) using the optical disc control unit 370. I/O Processor 325 of FIG. 3 may also allow for the introduction of content transferred over a wireless or other communications network (e.g., 4G, LTE, 1G, and so forth). The I/O processor 325 of FIG. 3 primarily controls data exchanges between the various devices of the entertainment system 300 including the CPU 310, the vector unit 315, the graphics processing unit 320, and the controller interface 335.

The graphics processing unit 320 of FIG. 3 executes graphics instructions received from the CPU 310 and the vector unit 315 to produce images for display on a display device (not shown). For example, the vector unit 315 of FIG. 3 may transform objects from three-dimensional coordinates to two-dimensional coordinates, and send the two-dimensional coordinates to the graphics processing unit 320. Furthermore, the sound processing unit 360 executes instructions to produce sound signals that are outputted to an audio device such as speakers (not shown). Other devices may be connected to the entertainment system 300 via the USB interface 345, and the IEEE 1394 interface 350 such as wireless transceivers, which may also be embedded in the system 300 or as a part of some other component such as a processor.

A user of the entertainment system 300 of FIG. 3 provides instructions via the controller interface 335 to the CPU 310. For example, the user may instruct the CPU 310 to store certain game information on the memory card 340 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A server system for management of non-linear content presentation and experience, the system comprising:
   a processor that executes instructions stored in memory, wherein execution of the instructions by the processor:
   evaluates at least one stream in real-time that is not currently being played at a user device to detect when an event occurs within the evaluated stream, wherein the detected event in the evaluated stream is detected based on analysis of one or more audio-visual cues within the evaluated stream,
   assigns a priority score to the detected event, based on a number of friends that have viewed the detected event and chat activity by the friends in relation to the detected event within the evaluated stream during an identified period of time,
   generates an offer to the user device regarding access to the detected event associated with the chat activity within the at least one stream,
   updates the assigned priority score in real-time, wherein the updated priority score is different than the assigned priority score, and wherein updating the assigned priority score is based on a number of friends that have viewed the detected event and chat activity by the friends in relation to the detected event within the evaluated stream during a subsequent period of time, and
   updates the offer in real-time based on the priority score assigned to the detected event being updated one or more times, wherein updating the offer generates one or more offers that requires a user of the user device to make a monetary payment or watch advertising; and
   a communication interface that communicates over a communication network, wherein the communication interface:
   provides a notification to the user device, wherein the notification includes the one or more generated offers,
   receives an acceptance response from the user device agreeing to the one or more generated offers, wherein the processor:
   identifies which one of the offers is applicable at a time of the acceptance response, and
   evaluates the acceptance response to the applicable offer to determine whether the applicable offer is satisfied; and
   provides the evaluated stream to the user device based on determining that the applicable offer is satisfied, wherein the evaluated stream is provided at a predefined point prior to the detected event in accordance with the applicable offer.

2. The system of claim 1, wherein the user device is playing another stream, and wherein the notification is overlaid on a portion of the other stream.

3. The system of claim 1, wherein the processor assigns the priority score further based on an amount of traffic in one or more social media feeds associated with the evaluated stream.

4. The system of claim 1, wherein the processor assigns the priority score further based on an amount of excitement factors indicated by metadata associated with the evaluated stream.

5. The system of claim 1, wherein the processor assigns the priority score further based on identifying that the detected event within the evaluated stream resulted in a lead change in a sporting event.

6. The system of claim 5, wherein the processor assigns the priority score further based on identifying that the lead change occurred toward an end of a sporting event.

7. A method for management of non-linear content presentation and experience, the method comprising:
evaluating at least one stream in real-time that is not currently being played at a user device to detect when an event occurs within the evaluated stream, wherein the detected event in the evaluated stream is detected based on analysis of one or more audio-visual cues within the evaluated stream;
assigning a priority score to the detected event, based on a number of friends that have viewed the detected event and chat activity by the friends in relation to the detected event within the evaluated stream during an identified period of time;
generating an offer to the user device regarding access to the detected event associated with the chat activity within the at least one stream;
updating the assigned priority score in real-time, wherein the updated priority score is different than the assigned priority score, and wherein updating the assigned priority score is based on a number of friends that have viewed the detected event and activity by the friends in relation to the detected event within the evaluated stream during a subsequent period of time;
updating the offer in real-time based on the priority score assigned to the detected event being updated one or more times, wherein updating the offer generates one or more offers that requires a user of the user device to make a monetary payment or watch advertising;
providing a notification to the user device, wherein the notification includes the one or more generated offers;
receiving an acceptance response from the user device agreeing to the one or more generated offers;
identifying which one of the offers is applicable at a time of the acceptance response;
evaluating the acceptance response to the applicable offer to determine whether the applicable offer is satisfied; and
providing the evaluated stream to the user device based on determining: that the applicable offer is satisfied, wherein the evaluated stream is provided at a predefined point prior to the detected event in accordance with the applicable offer.

8. The method of claim 7, further comprising sending a notification to the user device informing the user about the detected event.

9. The method of claim 8, wherein the user device is playing another stream, and wherein the notification is overlaid on a portion of the other stream.

10. The method of claim 7, wherein assigning the priority score is further based on an amount of traffic in one or more social media feeds associated with the evaluated stream.

11. The method of claim 7, wherein assigning the priority score is further based on an amount of activity at one or more other friend devices of the user device associated with the evaluated stream.

12. The method of claim 7, wherein assigning the priority score is further based on an amount of excitement factors indicated by metadata associated with the evaluated stream.

13. The method of claim 7, wherein assigning the priority score is further based on identifying that the detected event in the evaluated stream resulted in a lead change in a sporting event.

14. The method of claim 7, wherein assigning the priority score is further based on identifying that the lead change occurred toward an end of a sporting event.

15. A non-transitory computer-readable storage medium having embodied thereon a program executable by a processor to perform a method for management of nonlinear content presentation and experience, the method comprising:
evaluating at least one stream in real-time that is not currently being played at a user device to detect when an event occurs within the evaluated stream, wherein the detected event in the evaluated stream is detected based on analysis of one or more audio-visual cues within the evaluated stream;
assigning a priority score to the detected event, based on a number of friends that have viewed the detected event and chat activity by the friends in relation to the detected event within the evaluated stream during an identified period of time;
generating an offer to the user device regarding access to the detected event associated with the chat activity within the at least one stream;
updating the assigned priority score in real-time, wherein the updated priority score is different than the assigned priority score, and wherein updating the assigned priority score is based on a number of friends that have viewed the detected event and chat activity by the friends in relation to the detected event within the evaluated stream during a subsequent period of time;
updating, the offer in real-time based on the priority score assigned to the detected event being: updated one or more times, wherein updating the offer generates one or more offers that requires a user of the user device to make a monetary payment or watch advertising;
providing a notification to the user device, wherein the notification includes the one or more generated offers;
receiving an acceptance response from the user device agreeing to the one or more generated offers;
identifying which one of the offers is applicable at a time of the acceptance response;
evaluating the acceptance response to the applicable offer to determine whether the applicable offer is satisfied; and
providing the evaluated stream to the user device based on determining: that the applicable offer is satisfied, wherein the evaluated stream is provided at a predefined point prior to the detected event in accordance with the applicable offer.

16. The system of claim 1, wherein the processor changes the offer by changing one or more conditions of the generated offer in real-time, and wherein the changed offer includes one or more different conditions.

17. The system of claim 1, wherein the processor further identifies that the acceptance response satisfies the applicable offer by identifying that the acceptance response satisfies one or more conditions associated with the applicable offer.

18. The system of claim 17, wherein the processor identifies that the acceptance response satisfies the conditions associated with the applicable offer by:
identifying that at least one of the conditions has already been satisfied based on current status information regarding a user of the user device, and
verifying that the acceptance request satisfies a remaining set of the conditions associated with the applicable offer.

19. The system of claim 1, wherein the communication interface provides the evaluated stream to the user device by skipping at least one time period prior to the predefined point.

20. The system of claim 1, wherein the communication interface provides the evaluated stream to the user device by skipping a plurality of time periods within the evaluated stream.

21. The system of claim 20, wherein an order of the skipped plurality of time periods is non-linear.

22. The system of claim 21, wherein the communication interface skips to a next predefined point prior to a next detected event after providing the evaluated stream at the predefined point, wherein the next detected event occurs before the detected event within a linear presentation of the evaluated stream.

* * * * *